United States Patent
Goiffon

(10) Patent No.: US 7,207,045 B2
(45) Date of Patent: Apr. 17, 2007

(54) REAL TIME MULTI-TASK PROCESS AND OPERATING SYSTEM

(75) Inventor: Serge Goiffon, Toulouse (FR)

(73) Assignee: Airbus France, Toulouse (FR)

( * ) Notice: Subject to any disclaimer, the term of this patent is extended or adjusted under 35 U.S.C. 154(b) by 638 days.

(21) Appl. No.: 09/995,821

(22) Filed: Nov. 29, 2001

(65) Prior Publication Data

US 2002/0120662 A1    Aug. 29, 2002

(30) Foreign Application Priority Data

Dec. 21, 2000    (FR) .................................. 00 16762

(51) Int. Cl.
*G06F 9/46*    (2006.01)
*G06F 19/00*    (2006.01)

(52) U.S. Cl. ...................... 718/107; 718/100; 718/102; 718/103; 718/108; 701/120

(58) Field of Classification Search ........ 718/100–108; 701/120–301; 709/226
See application file for complete search history.

(56) References Cited

U.S. PATENT DOCUMENTS

| | | | |
|---|---|---|---|
| 5,210,872 A | | 5/1993 | Ferguson et al. |
| 6,085,215 A | * | 7/2000 | Ramakrishnan et al. .... 718/102 |
| 6,275,767 B1 | * | 8/2001 | Delseny et al. ............. 701/120 |
| 6,385,638 B1 | * | 5/2002 | Baker-Harvey ............ 718/107 |
| 6,687,257 B1 | * | 2/2004 | Balasubramanian ........ 370/429 |
| 6,757,897 B1 | * | 6/2004 | Shi et al. .................... 718/102 |
| 6,957,432 B2 | * | 10/2005 | Ballantyne .................. 718/100 |
| 6,990,665 B2 | * | 1/2006 | Ballantyne .................. 718/100 |

FOREIGN PATENT DOCUMENTS

| | | |
|---|---|---|
| EP | 0400500 | 12/1990 |
| EP | 0617361 | 9/1994 |

OTHER PUBLICATIONS

Silvasi-Patchin, "Real-Time Avionics in ADA 83", ACM, 1995, pp. 118-126.*
Fidge, "Real-Time Schedulability Tests for Preemptive Multitasking", Kluwer Academic Publishers, Boston, 1998, pp. 61-93.*
The Institute of Electrical and Electronic Engineers, Inc. Information Technology- Portable Operating System Interface (POSIX)—Part 1, ISO/IEC 9945-1, IEEE Std.1003.1, first edition, Dec. 7, 1990.
Ingram, D. "Soft Real Time Scheduling for General Purpose Client-Server Systems" University of Cambridge Computer Laboratory, Mar. 1999, 6 pp.

* cited by examiner

*Primary Examiner*—Meng-Al T. An
*Assistant Examiner*—Jennifer N. To
(74) *Attorney, Agent, or Firm*—Thelen Reid Brown Raysman & Steiner LLP

(57) ABSTRACT

The invention provides for a real-time multi-task operating process in which a set of fixed adjustable duration observation windows are defined having an allocation stage, in each observation window, of a maximum execution duration for each task, during which a scheduler guarantees a minimum execution time for lower priority tasks; a calculation stage for the time used by each task during each observation window; and a sanction stage during which the tasks, which exceed their quota in a given observation window, are sanctioned and can only return to a central resource unit during the following observation window.

13 Claims, 1 Drawing Sheet

REAL TIME MULTI-TASK PROCESS AND OPERATING SYSTEM

TECHNICAL DOMAIN

The present invention concerns a real time process and multi-task operating system, particularly in an ATSU-type calculator.

STATUS OF THE PREVIOUS TECHNIQUE

An ATSU (Air Traffic Services Unit) type calculator is an avionic calculator responsible for managing new ground/on board communications systems based on the use of information technology networks with global coverage. Such a calculator has a software architecture characterised by the implementation of a real time multi-task POSIX operating system.

This calculator can include software with different criticality levels. A high priority level is allocated to the most critical tasks so as to satisfy their real time constraints whatever the behaviour of the less critical tasks. Nevertheless, the latter do not have a minimum guaranteed access to the calculation resource that can be monopolised in part or in total by the most critical tasks.

One of the resources that can be shared by a POSIX real time operating systems, such as the one described in the document entitled, "POSIX document: Institute of Electrical and Electronic Engineers. Portable Operating system Interface—Part 1: System Application Program Interface (API)," is the calculation time (central unit time). Distribution is implemented by a router that relies on a criterion of priority and a measure of the execution time of tasks to implement a scheduling policy.

In such a real time operating system of the known technique the execution period of a task is generally measured with the help of so-called "tic" clock pulses generated by a period material counter and counted by an interruption programme in the software counters. Each clock pulse is allocated to the task that has the central unit resource at the time of the generation of the corresponding interruption. The systems keeps a global counter (or absolute clock) updated. It contains the number of clock pulses from the start-up of the system and a counter by task (or relative clock) that contains the number of clock pulses that have occurred while this task has the central unit resource.

So as not to damage the performance of such a system the duration between two clock pulses should be sufficiently long for their consideration time to remain negligible. This way of measuring the time leads to imprecise measurement of the duration of tasks as is shown by the chronogram illustrated in FIG. 1 with IT interruption-clocks. The measurement of the duration of two T1 and T2 tasks of the same 10.5 ms duration gives a measured value of 30 ms for the first task and 0 ms for the second task; the parts greyed "10" illustrate the use of the central unit resource.

The chosen scheduling mode in a ATSU-type calculator is the FIFO (First in-First Out) mode. In this mode the scheduler allocates the whole central unit resource for an indeterminate time to the task ready to be executed and of the highest priority. If several tasks of the same priority are ready to be executed they are managed in chronological order and the first in the list is executed until it is blocked. In this event the following in the list is executed. If a higher priority task becomes ready, the task being executed is pre-empted (it loses the central unit resource) and the higher priority one is executed. The scheduler guarantees that a task that has been pre-empted remains at the head of the list to resume execution before the others.

The functioning of such a scheduler is illustrated on FIG. 2. Operating system 11 includes a POSIX/UNIX 12 system interface. The applicative tasks are referenced 13. Time management unit 15 that receives IT interruptions of the material counter updates software counters (arrow 16). It sends to scheduler 18 (arrow 19) a rescheduling request during the expiration of the quantum time of the current task. Scheduler 18 allocates (arrow 20) the central unit resource to the task that has the highest priority ready to be executed.

Such a distribution policy naturally penalises the lower priority tasks since the central unit time that can be used by them depends on the time left free by the higher priority tasks.

An item of the known technique, as discussed in the document "Soft Real Time Scheduling for General Purpose Client-Server Systems" by David Ingram, considers the real time application scheduling problem in a general use operating system. This system is modified so as to take advantage of real time scheduling time while preserving the existing software. The architecture considered uses a POSIX-type scheduler. A QOS (Quality of Service) coefficient is defined by a couple of parameters: central unit time t, period of time t. A contract corresponding to such a coefficient defines that at least one duration t should be allocated to a task in each period T. the scheduler is informed'of the parameters to use for each task.

The aim of the invention is to compensate for the inconveniences defined above while proposing a real time multi-task process and operating device, particularly in an ATSU-type calculator.

REPORT ON THE INVENTION

The present invention concerns a real time multi-task operating process in which is defined a set of fixed adjustable duration observation windows, characterised by the fact that it includes:

an allocation stage of a maximum execution duration for each task in each window during which a scheduler guarantees a minimum execution time for lower priority tasks;

A calculation stage for time spent by each task during each observation window;

A sanction stage during which the tasks which exceed their quota in a given observation window are sanctioned and can only resume the central unit resource during the following observation window. The advantage of this during the calculation stage is that the value supplied by a global software counter is used and refined by adding to it the time passed since the last clock pulse read at one go in a material counter as well as a rerouting stage: a first rerouting point existing in the scheduler code, a second rerouting point existing in the interruption programme for treating clock pulses. The latter, which has higher priority than all the tasks of the system, allows the time spent by the task in progress to be calculated and to sanction it if its quota is exceeded.

The sanction stage takes place during a change of task (has the outgoing task exceeded its quota?) or during the generation of a clock pulse (has the current task exceeded its quota?). The sanction stage can consist of a lowering of the task priority, a stoppage of the task or a destruction of the task.

In a beneficial implementation mode the invention process includes:
- a start-up stage in which:
  - rerouting procedures are installed
  - a supervision task is launched
  - the duration of the observation window is configured
- a management task stage in which:
  - during the creation of a task:
    - the maximum duration of use of the central unit resource is configured in the observation window and the sanction to apply in the event of overshoot
    - the surveillance of this task is launched
  - during the termination of this task:
    - the surveillance of this is inhibited
  - during the switching of his outgoing ask to another entering task:
    - the event is dated
    - the time for start-up activation of the entering task is recorded
    - the time spent on the outgoing task during the observation window is calculated
    - a sanction is applied if the time spent by the outgoing task is higher than the maximum allocated
- a clock pulse management stage or "tic" in which:
  - the time spent by the task in progress is calculated
  - a sanction is applied if the time spent is higher than the maximum allocated time
- an observation window management stage in which:
  - at the beginning of the window the time spent on tasks is put at zero
  - at the end of the window the sanctioned tasks are rehabilitated The invention also concerns a real time multi-task operating system, characterised by the fact that it includes a surveillance module which contains a rerouting procedure code for putting in place rerouting points, an interface, for example a UNIX standard of accessible functions by a supervision task, a time management unit and a scheduler.

The invention system makes it possible, beyond temporal segregation constraints, to ensure a fairer distribution of the central unit resource and to improve the robustness of the system by controlling an exclusive potential use of the resource. It can also be advantageously used in an ATSU type calculator.

DETAILED REPORT OF IMPLEMENTATION MODES

In the invention process a set of observation windows is defined, of a fixed adjustable duration. In each window a maximum execution duration (a quota) is allocated to each task. During a given windows the task that exceeds their quota are sanctioned and can only resume the central unit resource during the following window. Also so as not to fall into the problem of measuring the previous technique such as previously described and to guarantee a reliable control of the distribution of the central unit resource, a precise calculation of the time spent in each task is made. In the invention process it is no longer the clock pulses, as described previously, which are counted according to the task in the process of execution. Instead, it is the dates for the beginning and end of their activation. To date these events, the value supplied by the global software counter is used; which is refined by adding to it the time spent since the last clock pulse (residue) read at one stroke in the material counter.

The dating of events during a change of task necessitates the putting into place of a rerouting point ("Hook" procedure) in the scheduler's existing code. Such a "Hook" process is a simple routine call familiar to the professional. Nevertheless this sole rerouting point does not allow the detection of an exclusive use of the central unit by a high priority task since specifically no change of task context can operate. Another rerouting point is thus placed in the process interruption programme of the clock pulses. The latter, with higher priority than all the system tasks makes it possible to calculate the time spent by the task in progress and to sanction it if its quota is exceeded. The reaction time of the sanction depends on the clock pulse duration. Thus in an operating system set to 10 ms, a task which consumes time excessively is sanctioned at the most 10 ms after exceeding its quota.

A surveillance module is integrated into the operating system as a pilot or "driver". It contains the rerouting procedures' code and offers a standard UNIX interface of accessible functions by the supervision task (parameterisation of surveillance, recovery of information about the consumption of tasks, reading of the history of overshoots).

A sanction can be applied at two points: on a change of task (has the outgoing task exceeded its quota?) or on the generation of a clock pulse (has the current task exceeded its quota?). A sanction is the subject of a trace preserved in a history that can be consulted by the supervision task. It can take several forms—lowering of task priority, stoppage of the task, or destruction.

Figure 1:
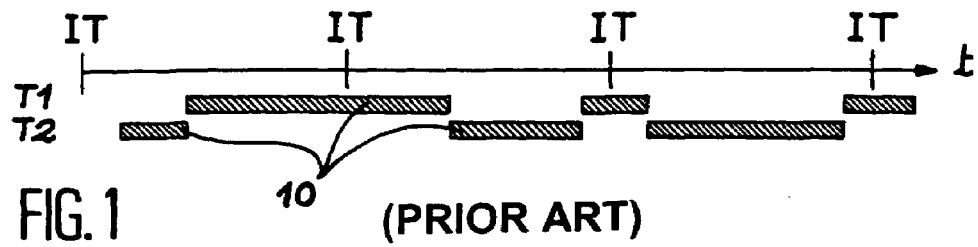
FIG. 1 illustrates a measurement of the execution duration in a system of the known technique.
Figure 2:
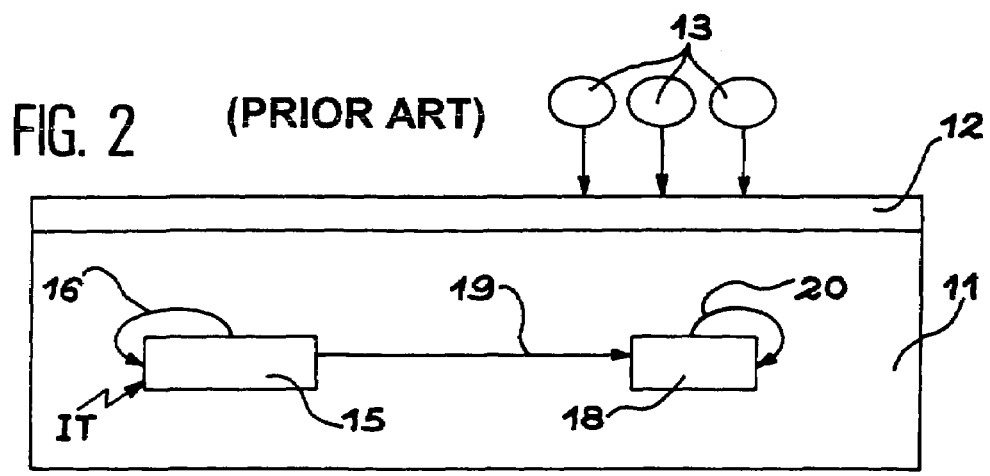
FIG. 2 illustrates the functioning of a scheduler in a real time multi-task operating system of the known technique.
Figure 3:
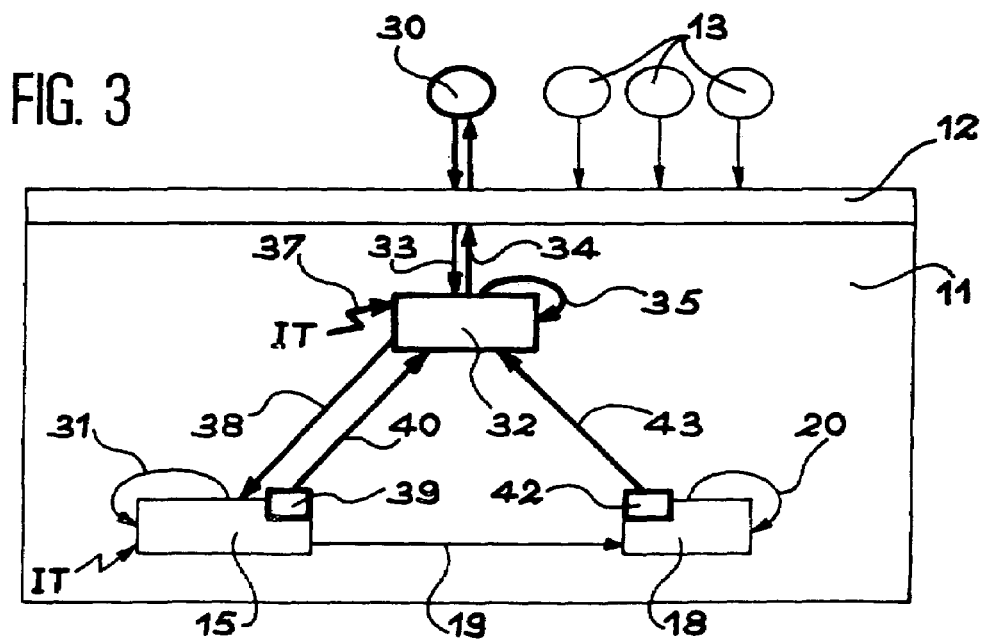
FIG. 3 illustrates the functioning of a scheduler in the real time multi-task time operating system of the invention.

FIG. 3 illustrates the functioning of a scheduler in the real time multi-task, operating process of the invention. The elements that already existed on FIG. 2 preserve the same references. The supervision task is referenced 30. Time management unit 15 enables at the same time (arrow 31):
- updating of software counters
- recovery of time residue A surveillance module 32 enables (arrow 33) an adjustable surveillance and sends (arrow 34) information on the status of tasks. It also enables (arrow 35):
- dating of events.
- control of use of central resource unit.
- A sanction.

It receives (arrow 37) IT interruptions of the software counter for the start of each observation window.

Time management unit 15 receives from surveillance module 32 message 38 for reading current time and sends counter event message 40 via rerouting process 39. Scheduler 18 sends task change event 43 to surveillance module 32 via rerouting process 42.

The functioning of such a system is summed up in table 1 located at the end of the description that is a table of states of the surveillance 32.

Two characteristics of the POSIX 1.d standard can be compared with the invention process:
- the "sporadic" server
- the surveillance and specific measurement of the execution time.

In this standard, this sporadic server consists of constantly keeping a reserve of central unit time in a so-called filling time for aperiodic tasks in the system. To the idea of a reserve is linked a notion of high priority processing. As soon as an aperiodic task is activated it passes to a high priority and draws from its time reserve. If its time reserve has passed it goes to low priority until the next filling time. In increasing the priority of lower priority tasks during a given time quota the latter are sure of being taken into account for a certain time.

On the other hand the approach of scheduler 18 according to the invention is the opposite. To guarantee an execution time for lower priority tasks this limits the execution time of higher priority tasks.

The POSIX.1b also suggests real time extensions for time management. It offers the opportunity to have access to an absolute clock with a greater precision than that given by the clock pulses' global software counter. It enables definition software alarms via this clock. The POSIX.1d standard suggests, also, the use of a relative clock concept: the execution time of each task is kept updated with greater precision than that given by the clock pulses' local software counter. In the same way as with the absolute clock it is possible to programme alarms associated to each relative clock. The expiration of the alarm triggers a signal to the task concerned which can decide itself to be suspended for a certain time before resuming the central unit resource: the global control of the execution time is the responsibility of each task and is a decentralised control.

The measurement of execution time of each task in the invention's scheduler 18 takes up this principle again but the decision to sanction a task is taken at the level of the scheduler in a centralised way.

We shall now describe the UNIX 12 standard interface. To control the parameters of the invention's scheduler 18 and to supervise the activities in a UNIX-type operating system, the pilot code or "drivers" is accessible by the user through a special file. The invention scheduler is a pilot that offers a user interface in the form of generic services applied on the special file and described in the POSIX 1003.1 standard. A specific implementation corresponds to a generic service specific to the pilot. Opening and closing file operations (with control of access rights), reading the overshoot history and finally the control/adjustable operation of the invention scheduler are all separate. The rerouting procedures are internal pilot services not directly accessible from the programme user.

The functioning of such an interface is illustrated in table 2 located at the end of the description.

Application of the Invention Procedure in an Avionic Configuration

The invention procedure can be used in the on board context of an ATSU (Air Traffic Services Unit) which manages the links between certain aeroplane equipment and ground/on board communication resources. The main functions of this calculator are carried out by the following applications:

the air traffic service application or ATC (management of crew dialogue/CPDLC/AFN, ADS surveillance)

the company operational communication or AOC applications

When the ATSU calculator is delivered the client company can implement its own applications, developed by itself or developed for it by a third party. The constraints associated with such a requirement are manifested by an acceptance structure enabling:

these different developments to be made as autonomous as possible.

The guaranteeing of the non perturbation of an ATC by an AOC application

The guaranteeing of a processing capacity for each task

Thus in the invention procedure quotas are allocated for the different tasks to guarantee a minimum execution time for AOC applications (lower priority than ATC applications). As soon as the quota is reached for an application a trace is preserved in the overshoot history and a sanction is applied. The quotas and sanctions for each ATSU application are listed in a configuration file. This file is read by the privileged process responsible for launching all the applications. This process thus positions the scheduling attributes for each application and enters in a surveillance mode in the expectation of possible quota overshoots.

TABLE 1

| SYSTEM EVENT | ACTION OF SURVEILLANCE MODULE 32 |
|---|---|
| Start-up of the system | install the rerouting procedures<br>launch the supervision task<br>configure the duration of the observation window (done by supervision task 30) |
| Creation of a task | configure the maximum duration of use of the central unit resource in an observation window and the sanction to apply in the event of overshoot (done by supervision task 30)<br>launch task supervision |
| Termination of a task | inhibit the task surveillance |
| Switching a task | date the event (from clock pulse software counters and the material counter residue)<br>record the activation time of the entering task<br>calculate the time spent by the outgoing task during the observation window (accumulation of activation times)<br>apply a sanction if the time spent is longer than the maximum allocated time (quota) |
| Material clock pulse ("tic") | calculate the time spent for the task in progress<br>apply a sanction if the time spent is longer than the maximum allocated time (quota) |
| Beginning of the observation window | put at zero the time spent for system tasks |
| End of the observation window | rehabilitate the sanctioned tasks |

TABLE 2

| UNIX/POSIX system interface | Parameters | Function carried out in the driver |
|---|---|---|
| Int open (char*filename, int mode) | .filename=/devfss0<br>.mode-0__RDWR<br>(Reading, writing)<br>returns a file descriptor | Check that the application which opens the file has the super-user privileges |
| Int close (int fd) | .fd= file descriptor | Check that the application which closes the file has the super-user privileges |

TABLE 2-continued

| UNIX/POSIX system interface | Parameters | Function carried out in the driver |
|---|---|---|
| Int read (int fd, Char*buf, int size) | .fd=file descriptor .buf=memory zone in which the (s) historic elements will be remounted .size=buf size | Consult the history of quota overshoots |
| Int write (intfd, int cmd Char*arg) | Not implemented | Not implemented |
| Int ioctl (int fd, int cmd, char*arg) | .fd= file descriptor .cmd=START_WINDOW .arg not used | Launch the period software counter which defines the duration of the observation window |
| | .fd=file descriptor .cmd=STOP_WINDOW .arg not used | Stop the periodic counter |
| Int ioctl (int fd, int cmd, char*arg) | .fd=file descriptor .cmd=SET_WINDOW_DE LAY .arg= value in milliseconds of the duration of the observation window | Configure the duration of an observation window |
| | .fd=file descriptor .cmd=GET_SCHED_VAL arg=scheduling attribute (quota and sanction positioned for a process) | Recover the scheduling attributes for an activity (quota and sanction) |
| | .fd=file descriptor .cmd=GET_SCHED_VAL arg=scheduling attributes | Position the scheduling attributes for an activity (quota and sanction type) |
| | .fd=file descriptor .cmd=GET_SCHED_VAL .arg=measurement values of the time spent by a task in the observation window | Recover the current values used by the driver to count the time of a task |

The invention claimed is:

1. A method for providing a real time operating process for multiple tasks, said process utilizing a plurality of time sensitive observation windows wherein said tasks are processed when in said observation windows, the method comprising:
   allotting a time quota in a first observation window to a first task having a high priority designation;
   allotting a remaining time quota in said first observation window to remaining tasks having priority designations lower than said first task where as at least a portion of each of said remaining tasks is guaranteed to be processed during said remaining time quota; and
   calculating an amount of time said first task is processed in said first observation window;
   sanctioning said first task to a second observation window when said calculated amount of time exceeds said time quota in said first observation window, wherein said sanctioning further comprises:
   switching from the first task to another task, wherein the switching includes:
      dating an event associated with the switching by supplying a value from a global software counter, wherein the value is adjusted by adding time passed since a last clock pulse from a material counter;
      recording starting time of the another task;
      calculating time spent by the another task during said first observation window; and
      sanctioning said another task if the time spent by said another task is longer than the maximum allocated time in said first observation window.

2. Real time multi-task operating method in an avionic computer, the method comprising:
   defining a set of fixed duration observation windows;
   allocating a maximum execution duration time for each task in a plurality of tasks during each observation window;
   calculating time used by each task during each observation window; and
   sanctioning a task which exceeds the allocated maximum execution duration time in an observation window, wherein the sanctioned task returns to a central resource unit during a subsequent observation window, and wherein said sanctioning further comprises:
   switching from the task to another task, wherein the switching includes:
      dating an event associated with the switching by supplying a value from a global software counter, wherein the value is adjusted by adding time passed since a last clock pulse from a material counter;
      recording starting time of the another task;
      calculating time spent by the another task during said observation window; and
      sanctioning said another task if the time spent by said another task is longer than the maximum allocated time in said observation window.

3. The method according to claim 2, further comprising rerouting the task having a first rerouting point existing in a scheduling code, a second rerouting point existing in a clock pulse process interruption program, said program with a higher priority than all system tasks enabling the calculation of the time spent by the task in progress and to sanction it if its quota is exceeded.

4. The method according to claim 2, wherein sanctioning the task occurs during a task change.

5. The method according to claim 2, wherein sanctioning the task occurs during duration of a clock pulse.

6. The method according to claim 2, wherein sanctioning the task includes either reducing a priority of the task, stopping the task or eliminating the task.

7. The method according to claim 2, further comprising initializing the operating process, the initializing including:
   starting rerouting procedures;
   launching the task; and
   configuring a duration of each observation window.

8. The method according to claim 7 further comprising creating a task including:
   configuring a maximum use duration of the central resource unit during the observation window;
   configuring the sanction to be eventually applied to the task; and
   launching surveillance of the task.

9. The method according to claim 8 wherein surveillance of the task is inhibited when the task is terminated.

10. The method according to claim 7 further comprising managing a clock impulse, the managing including:
   calculating time spent by the task;
   sanctioning the task if the time spent by the task is longer than the maximum allocated time for the observation window.

11. The method according to claim 7 further comprising managing an observation window including:
   setting time spent by the task at a beginning of the observation window to a value of zero; and
   rehabilitating the task which has been sanctioned.

12. The method according to claim 2 wherein the avionic computer comprises an Air Traffic Service Unit calculator.

13. A real time multi-task operating system executed by an avionic computer comprising:
   a surveillance module which enables a surveillance parameterization, the surveillance module configured to date events by supplying a value from a global software counter, wherein the value is adjusted by adding time passed since a last clock pulse from a material counter, and control use of a central resource unit, the surveillance module capable of sanctioning a task and providing information on a status of the task;
   a functions interface accessible by a supervision task;
   a time management unit configured to receive message from the surveillance module; and
   a scheduler configured to guarantee a desired amount of processing time for a lower priority task in each observation window, wherein a particular task is sanctioned to a subsequent processing window when a time quota allotted to the particular task is exceeded.

* * * * *